(12) United States Patent
Drumm et al.

(10) Patent No.: US 9,637,102 B2
(45) Date of Patent: May 2, 2017

(54) BRAKE SYSTEM FOR MOTOR VEHICLES AND METHOD FOR OPERATING THE BRAKE SYSTEM

(75) Inventors: Stefan A. Drumm, Saulheim (DE); Steffen Linkenbach, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 247 days.

(21) Appl. No.: 14/114,387

(22) PCT Filed: Apr. 2, 2012

(86) PCT No.: PCT/EP2012/055942
§ 371 (c)(1),
(2), (4) Date: May 1, 2014

(87) PCT Pub. No.: WO2012/146461
PCT Pub. Date: Nov. 1, 2012

(65) Prior Publication Data
US 2014/0225425 A1    Aug. 14, 2014

(30) Foreign Application Priority Data

Apr. 28, 2011  (DE) .......... 10 2011 017 703
Feb. 21, 2012  (DE) .......... 10 2012 202 645

(51) Int. Cl.
*B60T 13/66*     (2006.01)
*B60T 13/58*     (2006.01)
(Continued)

(52) U.S. Cl.
CPC ........... *B60T 13/58* (2013.01); *B60T 7/042* (2013.01); *B60T 8/321* (2013.01); *B60T 8/4081* (2013.01);
(Continued)

(58) Field of Classification Search
CPC ...... B60T 13/142; B60T 13/58; B60T 13/588; B60T 13/66; B60T 13/686; B60T 13/745;
(Continued)

(56) References Cited

U.S. PATENT DOCUMENTS

2008/0223670 A1    9/2008 Toyohira et al.
2009/0062991 A1*   3/2009 Hayashikawa ..... B60T 8/17616
                                                      701/48
(Continued)

FOREIGN PATENT DOCUMENTS

DE    195 38 794 A1    4/1997
DE    195 43 582 A1    6/1997
(Continued)

OTHER PUBLICATIONS

Klobedanz et al., "Task Migration for Fault-Tolerant FlexRay Networks", 2010, IFIP International Federation for Information Processing 2010, IFIP AICT 329, p. 585-65.*
(Continued)

*Primary Examiner* — Anna Momper
(74) *Attorney, Agent, or Firm* — Brinks Gilson & Lione

(57) ABSTRACT

A brake system includes a brake pedal for actuating a master cylinder having two pistons and corresponding pressure chambers, where the system can be operated in a brake-by-wire mode and also a fallback mode. The system also includes a first electrically controllable pressure source and a second electrically controllable pressure source. The first and second electrically controllable pressure sources each have corresponding output flows that are connected together. The second electrically controllable pressure source can therefore provide output volume flow in the event the first electrically controllable pressure source fails.

15 Claims, 2 Drawing Sheets

(51) Int. Cl.
| | |
|---|---|
| *B60T 7/04* | (2006.01) |
| *B60T 8/32* | (2006.01) |
| *B60T 8/40* | (2006.01) |
| *B60T 8/88* | (2006.01) |
| *B60T 13/14* | (2006.01) |
| *B60T 13/68* | (2006.01) |

(52) U.S. Cl.
CPC ............ *B60T 8/885* (2013.01); *B60T 13/146* (2013.01); *B60T 13/662* (2013.01); *B60T 13/686* (2013.01); *B60T 2270/402* (2013.01); *B60T 2270/404* (2013.01); *B60T 2270/82* (2013.01)

(58) Field of Classification Search
CPC .... B60T 8/4072; B60T 13/662; B60T 13/146; B60T 2270/404
See application file for complete search history.

(56) References Cited

U.S. PATENT DOCUMENTS

| | | | |
|---|---|---|---|
| 2010/0001577 A1* | 1/2010 | Hatano | ................. B60T 8/4081 303/3 |
| 2011/0241417 A1* | 10/2011 | Miyazaki | ................. B60T 7/042 303/2 |
| 2012/0000738 A1* | 1/2012 | Inoue | ................. B60T 8/4081 188/106 P |

FOREIGN PATENT DOCUMENTS

| | | |
|---|---|---|
| DE | 199 05 660 A1 | 5/2000 |
| DE | 10 2008 010 528 A1 | 9/2008 |
| DE | 10 2008 015 241 A1 | 9/2008 |
| DE | 10 2009 031 392 A1 | 1/2010 |
| DE | 10 2010 040 097 A1 | 3/2011 |
| EP | 0 280 740 A1 | 8/1987 |
| EP | 0 485 367 A2 | 6/1989 |
| EP | 1 334 893 A2 | 8/2003 |
| EP | 1 481 863 A1 | 1/2004 |
| EP | 2 520 473 A1 | 11/2012 |
| JP | 2008-100588 | 5/2008 |
| JP | 2010-52504 | 3/2010 |
| JP | WO 2010107067 A1 * | 9/2010 ............ B60T 8/4081 |
| WO | WO 91/05686 | 5/1991 |
| WO | WO 00/34097 | 6/2000 |
| WO | WO 2011/029812 A1 | 3/2011 |

OTHER PUBLICATIONS

German Examination Report—Dec. 5, 2012.
PCT International Search Report—Jul. 19, 2012.

* cited by examiner

US 9,637,102 B2

BRAKE SYSTEM FOR MOTOR VEHICLES AND METHOD FOR OPERATING THE BRAKE SYSTEM

CROSS-REFERENCE TO RELATED APPLICATIONS

This application claims priority to German Patent Application Nos. 10 2011 017 703.5, filed Apr. 28, 2011 and 10 2012 202 645.2, filed Feb. 21, 2012, and PCT/EP2012/055942, filed Apr. 2, 2012.

FIELD OF THE INVENTION

The present invention relates to a brake system for motor vehicles, which can be controlled in a "brake-by-wire" operating mode both by the driver of the vehicle and also independently of the driver of the vehicle, which brake system is preferably operated in the "brake-by-wire" operating mode and can be operated in at least one fallback operating mode, in which only the operation by the driver of the vehicle is possible, having:

a) a brake pedal for the purpose of actuating a master brake cylinder having a housing, two pistons that are arranged one behind the other, which pistons delimit two pressure chambers in the housing, upon which pistons an actuating force (pedal force) is exerted during actuation of the brake system by the driver of the vehicle and said pistons are positioned in a starting position by return springs in the case of the brake pedal not being actuated, b) a pressure medium storage container that is under atmospheric pressure and comprises at least two chambers that are allocated to the pressure chambers, c) a travel detecting device that detects the actuation path of the brake pedal or of a piston that is connected to the brake pedal, d) a pressure sensor for the purpose of detecting a hydraulic pressure that is built up in the master brake cylinder by way of the actuating force, e) a travel simulator having a simulator release valve that conveys the conventional brake pedal sensation to the driver of the vehicle in the "brake-by-wire" operating mode, wherein said travel simulator is connected in a hydraulic manner to one of the pressure chambers and the effect of said travel simulator can be interrupted in the fallback operating mode, f) an electrically controllable pressure source that provides a brake system pressure, g) a second pressure sensor for the purpose of detecting the brake system pressure, h) a pressure modulation unit that comprises for each wheel brake an intake valve and an exhaust valve for the purpose of adjusting wheel-specific brake pressures that are derived from the brake system pressure, wherein in the non-actuated state the intake valves pass the brake system pressure onto the wheel brakes and the exhaust valves interrupt a flow of pressure medium from the wheel brakes, i) having separating valves for the purpose of separating the master brake cylinder pressure chambers from the pressure modulation unit and having switching valves for the purpose of connecting the electrically controllable pressure source to the pressure modulation unit in a hydraulic manner, and j) an electronic control and regulation unit.

BACKGROUND OF THE INVENTION

A brake system of this type is disclosed in WO 2011/029812 A1. It is felt that a serious disadvantage of the previously known brake system is the fact that in the event of a failure of the control or of the actuation of the electrically controllable pressure source the function of the brake system in the "brake-by-wire" operating mode is not available.

It is therefore the object of the present invention to improve a brake system of the type mentioned in the introduction to the effect that even in the event of a failure of the electrically controllable pressure source or a component thereof, a brake-by-wire function continues to be available.

SUMMARY AND INTRODUCTORY DESCRIPTION OF THE INVENTION

This object is achieved in accordance with the invention by way of the technical features disclosed herein and by way of the method disclosed herein.

It is preferable that the pressure connector of the second electrically controllable pressure source, in particular the pump, is connected to a (brake) system pressure line that supplies the switching valves. The pressure connector of the second electrically controllable pressure source is therefore connected to the hydraulic connection line between the first electrically controllable pressure source and the switching valve.

BRIEF DESCRIPTION OF THE DRAWINGS

The present invention is further described in the following description with reference to the attached schematic figures of an exemplary embodiment.

DETAILED DESCRIPTION OF THE INVENTION

Figure 1:
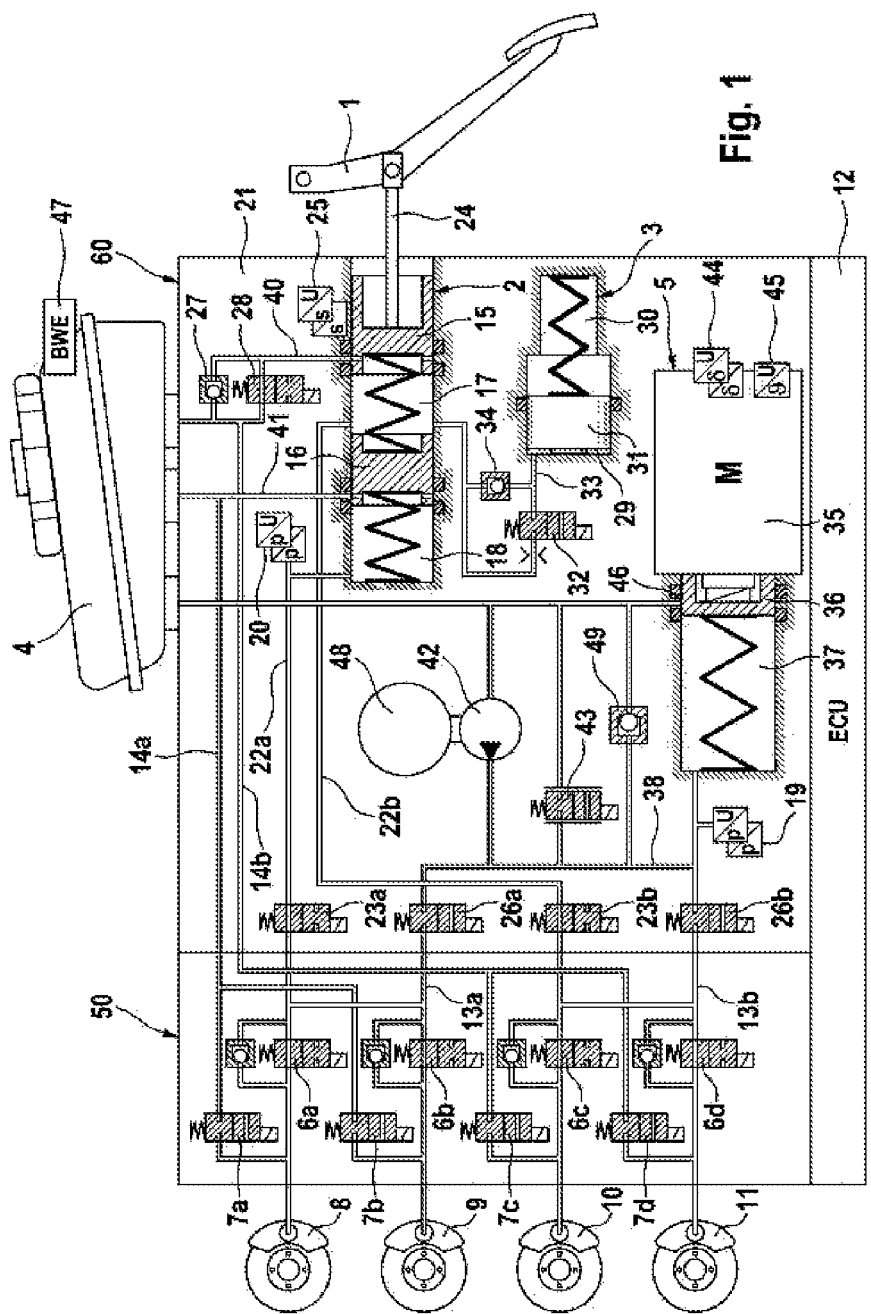
FIG. 1 illustrates a hydraulic schematic diagram of a brake system in accordance with the example.

The brake system that is illustrated in the drawing comprises essentially a hydraulic actuation unit 2 that can be actuated by means of an actuation device and/or a brake pedal 1, a travel simulator 3 that works in conjunction with the hydraulic actuation unit 2, a pressure medium storage container 4 having an electric fill level sensor 47, which pressure medium storage container is allocated to the hydraulic actuation unit 2, a first electrically controllable pressure source 5, electrically controllable pressure modulation and/or intake and exhaust valves 6a-6d, 7a-7d, which are interconnected in pairs in a hydraulic manner by way of intermediate connectors and are connected to wheel brakes 8, 9, 10, 11 of a motor vehicle, not illustrated. The input connectors of the intake valves 6a-6d are supplied with pressures by means of brake circuit pressure lines 13a, 13b, which pressures in the "brake-by-wire" operating mode are provided by a (brake)system pressure, which is available in a (brake) system pressure line 38 that is connected to a pressure chamber 37 of the first electrically controllable pressure source 5 and in the fallback operating mode are influenced by the pressures of the master brake cylinder chambers 17, 18, while the output connectors of the exhaust valves 7a-7d are connected in pairs to the pressure medium storage container 4 by way of return lines 14a, 14b. In order to detect the pressure that is prevailing in the system pressure line 38, a pressure sensor 19 is preferably provided in a redundant manner.

The previously mentioned components 6a-6d, 7a-7d, 13a, 13b, 14a, 14b are brought together to form an electro-hydraulic module and as a consequence embody a pressure modulation unit that is provided with the reference numeral 50.

As is further illustrated in FIG. 1, the hydraulic actuation unit 2 of the brake system in accordance with the invention comprises two hydraulic pistons 15, 16 that are arranged one behind the other in a housing 21 and delimit the hydraulic chambers and/or pressure chambers 17, 18, which chambers embody a dual circuit master brake cylinder and/or a tandem master cylinder together with the pistons 15, 16. The pressure chambers 17, 18 are connected on the one side to the pressure medium storage container 4 by way of radial bore holes that are embodied in the pistons 15, 16 and also corresponding pressure equalizing lines 40, 41, wherein the latter can be disconnected by way of a relative movement of the pistons 17, 18 in the housing 21, and on the other hand are connected by means of hydraulic lines 22a, 22b to the previously mentioned brake circuit pressure lines 13a, 13b, by way of which the pressure modulation unit 50 is connected to the actuation unit 2. A parallel connection of a non-energized open diagnosis valve 28 having a return valve 27 that closes towards the pressure medium storage chamber 4 is contained in the pressure equalizing line 40. The line sections 22a, 22b that are connected to the master cylinder pressure chambers 17, 18 are connected to the brake circuit pressure lines 13a, 13b by way of a respective separation valve 23a, 23b, which separation valves are embodied in each case as a 2/2 directional control valve that can be electrically actuated and is preferably open when de-energized. A pressure sensor 20 that is connected to the line section 22a detects the pressure in the pressure chamber 18 that is produced by way of a displacement of the second piston 16. Furthermore, the pressure chambers 17, 18 receive return springs that are not described in detail, which return springs position the pistons 15, 16 in a starting position when the master brake cylinder is not actuated. A piston rod 24 couples the pivoting movement of the brake pedal 1, as a consequence of actuating the pedal, to the translatory movement of the first (master cylinder) piston 15, whose actuating travel is detected by a travel sensor 25 that is embodied preferably in a redundant manner. As a consequence the corresponding piston travel signal is an indication of the pedal actuation angle. It represents a braking wish of a driver of the vehicle.

Furthermore, it is evident from the illustrated representation of the brake system in accordance with the invention that the previously mentioned travel simulator 3 is coupled to the master brake cylinder 2 in a hydraulic manner and is embodied for example as an independent assembly that is essentially embodied from a simulator chamber 29, a simulator spring chamber 30 and a simulator piston 31 that separates the two chambers 29, 30 from each other. The simulator chamber 29 can be connected to the first pressure chamber 17 of the tandem master cylinder 2 by means of a simulator release valve 32 that can be electrically actuated. When a pedal force is being provided and the simulator release valve 32 is activated, pressure medium flows from the master brake cylinder pressure chamber 17 into the simulator chamber 29. The pedal sensation that is generated as a result of this depends upon the counter pressure that is built up in the travel simulator and the regulating characteristics of the activated simulator release valve 32. A return valve 34 that is arranged in a hydraulic antiparallel manner with respect to the simulator release valve 32 renders possible a substantially unhindered return flow of the pressure medium from the simulator chamber 29 to the master brake cylinder pressure chamber 17 independently of the simulator release valve 32 switching state and independently of its regulation effect. The resulting undamped release of the brake pedal is a pleasant experience. Without this function, the impression of so-called "sticky" brakes could occur. A hydraulic connector 33 is arranged at a position of the simulator chamber 29 where any gas bubbles potentially collect, so that during a release of the brake pedal said gas bubbles are transported with the pressure medium flow by way of the return valve 34 into the master brake cylinder pressure chambers, from where they can be discharged into the pressure medium storage container 4 by way of the pressure equalizing line 40.

Finally, it is evident from the figures that the first electrically controllable pressure source 5 is embodied as a hydraulic cylinder piston arrangement and/or is embodied as a one-circuit electro-hydraulic actuator, whose piston 36 can be actuated by a schematically illustrated electric motor 35 by inter-positioning a likewise schematically illustrated rotation/translation drive. A rotor position sensor that is only illustrated schematically and is used to detect the rotor position of the electric motor 35 is designated by the reference numeral 44. In addition, a temperature sensor 45 can also be used for the purpose of sensing the temperature of the motor coil. The piston 36 delimits a pressure chamber 37. An elastomer sealing ring is used in order to seal the gap between the piston 36 and the pressure chamber wall, which elastomer sealing ring is arranged in a groove on the piston 36 or however as illustrated—in the case of using a plunger piston—in a groove of the wall. The plunger principle renders possible the arrangement of a lubrication connector 46 that is connected to the pressure medium storage container 4. As a consequence, the two tasks of the sealing arrangement to provide a seal to prevent a drop of pressure and to seal an air filled chamber with respect to a pressure medium filled chamber of the same pressure, are divided between two elastomer sealing rings, wherein the two tasks can be optimized with respect to their special task.

In accordance with the invention, a second electronically controllable pressure source is provided, which pressure source in accordance with the example is embodied by way of a pump 42 that is driven by an electric motor 48. The two electronically controllable pressure sources supply the pressure medium that is discharged from them into the system pressure line 38, so that despite a possible failure of one of the pressure sources, a system pressure continues to build up in an electronically controlled manner. The particular advantage of this is that the two pressure sources are embodied technically different from one another. The electro-hydraulic actuator 5 functions in a particularly dynamic manner, very quietly and easily tolerates the number of load cycles required for brake systems. Said electro-hydraulic actuator is used for the majority of brake applications. The motor pump assembly 42, 48 is preferably embodied from the type of piston pump 42 that is actuated by the electric motor 48 by way of an eccentric in a configuration that is already used million fold in known brake systems as a return pump. This can generate particularly high system pressures and can be achieved in a very compact overall size. In contrast to the electro-hydraulic actuator 5, the pressure medium volume that can be provided by the motor pump assembly 42, 48 cannot be depleted, because the pump 42 draws pressure medium from the pressure medium storage container 4.

The actuating pressure that is generated by way of the action of force of the piston 36 on the pressure medium that is enclosed in the pressure chamber 37 is fed into the system pressure line 38 and detected by the system pressure sensor 19. As previously mentioned, the sealing arrangement of the piston 36 in the cylinder of the actuator 5 is preferably achieved with two elastomer sealing rings, wherein a connector 46 that is connected to the pressure medium storage container 4 for the purpose of wetting the actuating side of the elastomer sealing ring that carries the pressure and for wetting the hydraulic side of the elastomer sealing ring that separates the medium. In the "brake-by-wire" operating mode the system pressure line 38 is connected to the brake circuit pressure lines 13a, 13b by way of the switching valves 26a, 26b. In this manner, a wheel brake pressure is applied and reduced on all wheel brakes 8, 9, 10, 11 during a normal brake application. As the pressure is reduced, the pressure medium that was previously displaced from the pressure chamber 37 of the actuator 5 into the wheel brakes flows back into the pressure chamber 37 of the actuator 5 in the same way. In contrast, in the case of a brake application with wheel brake pressures that differ for individual wheels and are controlled with the aid of the modulation valves, the portion of pressure medium that is discharged by way of the exhaust valves 7a-d flows into the pressure medium storage container 4. In the case of a brake application which lasts for an extended time period and involves wheel brake modulation, the pressure medium volume in the actuator pressure chamber 37 must therefore be refilled from the pressure medium storage container 4. Different pressure medium paths are available for this purpose. The preferred path leads through the pump 42. If this pump is driven by way of the electric motor 48, said pump conveys pressure medium from the pressure medium storage container 4 into the system pressure line 38, which is available for the purpose of building up brake pressure. Excess volume is discharged by way of the electromagnet valve 43. The process as required by the prior art is omitted, which process involves taking in pressure medium from the pressure medium storage container 4 by means of moving back the actuator piston 36, which process is encumbered with an undesired but in the prior art unavoidable interruption in the provision of system pressure. It is only necessary to use this process of taking in pressure medium from the pressure medium storage container 4 in the event of a possible failure of the second electrically controllable pressure source. Said in-take process is performed by way of further hydraulic paths: in the case of a return of the piston 36 while the switching valves 26a, 26b are closed pressure medium flows from the container 4 by way of an intake valve 49 into the actuator pressure chamber 37, which intake valve is embodied as a return valve that opens in the direction of flow towards the actuator. The elastomer sealing ring that supports the actuator pressure can be embodied parallel to this as a lip sealing ring, which sealing ring has no sealing effect in the case of a negative pressure difference and consequently opens a second intake path. Finally, a displacement pump type having pressure actuated valves can be selected as a pump 42, which allows volume flows to pass through practically unhindered in the direction of the pressure build up.

The previously mentioned components 2, 3, 5, 19, 20, 22a, 22b, 23a, 23b, 26a, 26b, 27, 28, 32, 33, 34, 40, 41, 42, 43, 46, 48, 49 can be combined to form a second electrohydraulic module that is provided with the reference numeral 60. An electronic control and regulation unit 12 controls components of the brake system in accordance with the invention that can be electrically actuated.

Figure 2:
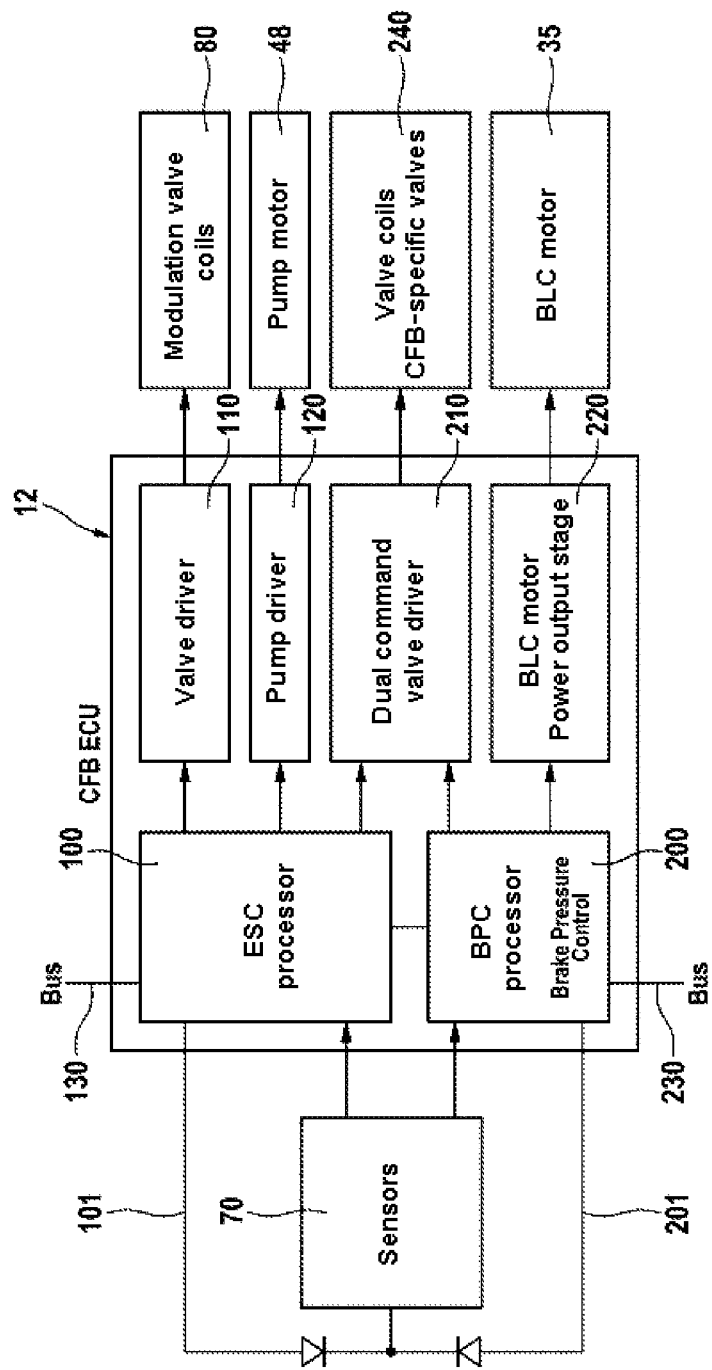
FIG. 2 illustrates the construction of the electronic control and regulation unit.

As is particularly evident from FIG. 2, the electronic control and regulation unit 12 that was previously mentioned in connection with FIG. 1 is embodied in an electrical dual circuit manner and comprises essentially a first processor 100 that is allocated to the first electrical circuit and a second processor 200 that is allocated to the second electrical circuit, the output signals of the previously mentioned sensors 19, 20, 25, 44, 45 are supplied to said processors as input parameters in accordance with the example, which sensors are illustrated schematically as an entire block 70 in FIG. 2. The sensors 70 comprise an electrical energy supply that is supplied in a redundant manner from the two electrical circuits (see lines 101, 201). The first circuit additionally comprises a valve driver assembly 110 for the pressure modulation valves 6a-6d, 7a-7d of the pressure modulation unit 50 and a pump driver 120 for the purpose of actuating the electric motor which drives the pump 42, which electric motor is provided in FIG. 1 with the reference numeral 48. The electromagnetic coils of the pressure modulation valves are illustrated in FIG. 2 as a second entire block 80, while the electric motor is illustrated as a single block symbol 48. The second electrical circuit comprises, in addition to the second processor 200, a second valve driver assembly 210 for the purpose of controlling the separation valves 23a, 23b, the switching valves 26a, 26b, the simulator release valve 32 and the diagnosis valve 28, and a power output stage 220 for the purpose of controlling the electrical drive 35 of the first electrically controllable pressure source 5. The electromagnetic coils of the separation valves 23a, 23b, of the switching valves 26a, 26b, of the simulator release valve 32 and the diagnosis valve 28 are illustrated by way of a further block 240.

In addition, it is evident from the illustrated representation of the control and regulation unit in accordance with the example, that the second valve driver assembly 210 can be controlled by the first processor 100 in addition to being able to be controlled by the second processor 200. A connection of the two processors 100, 200 to a communication system, not illustrated, of the motor vehicle is finally illustrated by way of a respective bus 130, 230.

The functioning of the brake system in accordance with the invention both in the preferred "brake-by-wire" operating mode and also in the so called fallback operating mode is evident to the expert in the relevant technical field from the disclosure of the present patent application and therefore does not need to be further explained.

While the above description constitutes the preferred embodiment of the present invention, it will be appreciated that the invention is susceptible to modification, variation, and change without departing from the proper scope and fair meaning of the accompanying claims.

The invention claimed is:

1. A brake system for motor vehicles, controllable in a brake-by-wire operating mode both by a driver of the vehicle and also independently of the driver of the vehicle, the brake system is operable in the brake by wire operating mode and operable in at least one fallback operating mode, in which only the operation by the driver of the vehicle is possible, comprising:

a brake pedal for the purpose of actuating a master brake cylinder having a housing, two pistons that are arranged one behind the other, at least one of the two pistons being connected to the brake pedal, which two pistons each limit two corresponding pressure chambers in the housing, upon which pistons an actuating force received from the brake pedal is exerted during actuation of the brake pedal by the driver of the vehicle and the two pistons are positioned in a starting position by return springs in the case of the brake pedal not being actuated, a pressure medium storage container that is under atmospheric pressure and having at least two storage chambers that are allocated to the pressure chambers, a travel detecting device that detects the actuation displacement of the brake pedal or the least one of the two pistons that is connected to the brake pedal, a first pressure sensor for the purpose of detecting a hydraulic pressure that is built up in the master brake cylinder by way of the actuating force received from the brake pedal, a travel simulator having a simulator release valve that conveys a haptic brake pedal sensation effect to the driver when operating in the brake-by-wire operating mode, wherein the travel simulator is connected in a hydraulic manner to one of the pressure chambers and the effect of the travel simulator can be interrupted in the fallback operating mode, a first electrically controllable pressure source that provides a brake system pressure, a second pressure sensor for detecting the brake system pressure, a pressure modulation unit that includes for each of at least one wheel brake an intake valve and an exhaust valve for adjusting the brake pressures for individual wheels of the vehicle, which brake pressures are derived from the brake system pressure, wherein in the non-actuated state, the intake valves pass the brake system pressure onto the wheel brakes and the exhaust valves interrupt the flow of pressure medium from the wheel brakes, separating valves for separating the master brake cylinder pressure chambers from the pressure modulation unit, switching valves for connecting the first electrically controllable pressure source to the pressure modulation unit in a hydraulic manner, an electronic control and regulation unit, a second electrically controllable pressure source having an output volume flow that is connected together with an output volume flow of the first electrically controllable pressure source, wherein the electronic control and regulation unit includes a first electrical circuit and a second electrical circuit, and wherein the wherein the first electrical circuit comprises a first processor and the second electrical circuit comprises a second processor, a second valve driver assembly for the separation valves and the switching valves, and a power output stage for controlling the electrical drive of the first electrically controllable pressure source;

wherein the first electrical circuit further comprises a valve driver assembly for the inlet valves and the exhaust valves of the pressure modulation unit, and a pump driver for the second electrically controllable pressure source for an electric motor of a pump of the second electrically controllable pressure source.

2. The brake system as claimed in claim 1, wherein a pressure connector of the second electrically controllable pressure source is connected to a system pressure line that supplies the switching valves.

3. The brake system as claimed in claim 1, wherein the second electrically controllable pressure source is embodied as a hydraulic pump that is driven by an electric motor.

4. The brake system as claimed in claim 3, wherein an intake connector of the pump is connected to the pressure medium storage container.

5. A brake system for motor vehicles, controllable in a brake-by-wire operating mode both by a driver of the vehicle and also independently of the driver of the vehicle, the brake system is operable in the brake by wire operating mode and operable in at least one fallback operating mode, in which only the operation by the driver of the vehicle is possible, comprising:

a brake pedal for the purpose of actuating a master brake cylinder having a housing, two pistons that are arranged one behind the other, at least one of the two pistons being connected to the brake pedal, which two pistons each limit two corresponding pressure chambers in the housing, upon which pistons an actuating force received from the brake pedal is exerted during actuation of the brake pedal by the driver of the vehicle and the two pistons are positioned in a starting position by return springs in the case of the brake pedal not being actuated, a pressure medium storage container that is under atmospheric pressure and having at least two storage chambers that are allocated to the pressure chambers, a travel detecting device that detects the actuation displacement of the brake pedal or the least one of the two pistons that is connected to the brake pedal, a first pressure sensor for the purpose of detecting a hydraulic pressure that is built up in the master brake cylinder by way of the actuating force received from the brake pedal, a travel simulator having a simulator release valve that conveys a haptic brake pedal sensation effect to the driver when operating in the brake-by-wire operating mode, wherein the travel simulator is connected in a hydraulic manner to one of the pressure chambers and the effect of the travel simulator can be interrupted in the fallback operating mode, a first electrically controllable pressure source that provides a brake system pressure, a second pressure sensor for detecting the brake system pressure, a pressure modulation unit that includes for each of at least one wheel brake an intake valve and an exhaust valve for adjusting the brake pressures for individual wheels of the vehicle, which brake pressures are derived from the brake system pressure, wherein in the non-actuated state, the intake valves pass the brake system pressure onto the wheel brakes and the exhaust valves interrupt the flow of pressure medium from the wheel brakes, separating valves for separating the master brake cylinder pressure chambers from the pressure modulation unit, switching valves for connecting the first electrically controllable pressure source to the pressure modulation unit in a hydraulic manner, an electronic control and regulation unit, a second electrically controllable pressure source having an output volume flow that is connected together with an output volume flow of the first electrically controllable pressure source, wherein the electronic control and regulation unit includes a first electrical circuit and a second electrical circuit, and wherein the wherein the first electrical circuit comprises a first processor, a valve driver assembly for the inlet valves and the exhaust valves of the pressure modulation unit, and a pump driver for the second electrically controllable pressure source for an electric motor of a pump of the second electrically controllable pressure source, and the second electrical circuit comprises a second processor, a second valve driver assembly for the separation valves and the switching valves, and a power output stage for controlling the electrical drive of the first electrically controllable pressure source;

wherein the second valve driver assembly is controllable by the first processor in addition to being controllable by the second processor;

wherein the second valve driver assembly is independently controllable by one of the first processor or the second processor when the other of the first processor or the second processor is not working.

6. The brake system as claimed in claim 1 wherein the first and second pressure sensors and the travel detecting device have an electrical energy supply that is supplied from the first and second electrical circuits.

7. The brake system as claimed in claim 6, wherein the pressure sensors and the travel detecting device generate signals that are supplied to the first processor and to the second processor.

8. The brake system as claimed in claim 1, wherein both the first processor and the second processor are connected to at least one vehicle communication system.

9. A method for operating a brake system as claimed in claim 1, the method comprising:
  operating the system in an ABS brake operating mode;
  during the ABS brake operating mode, reducing the brake pressure by the pressure modulating unit;
  supplying pressure medium volume to the pressure medium storage container as the pressure is reduced by the modulation unit;
  supplying pressure medium volume from the pressure medium storage container to a system pressure line that supplies the switching valves, wherein the pressure medium volume is made available with the aid of a pump to the system pressure line that supplies the switching valves.

10. The method as claimed in claim 9, further comprising determining that the first electrically controllable pressure source cannot function, and in response thereto, providing the system brake pressure by the pump alone.

11. The method as claimed in claims 9 further comprising determining a failure of the electronic control and regulation unit, and in response thereto, providing the system brake pressure with the aid of the pump.

12. A brake system for motor vehicles, controllable in a brake-by-wire operating mode both by a driver of the vehicle and also independently of the driver of the vehicle, the brake system is operable in the brake by wire operating mode and operable in at least one fallback operating mode, in which only the operation by the driver of the vehicle is possible, comprising:
  a brake pedal for the purpose of actuating a master brake cylinder having a housing, two pistons that are arranged one behind the other, at least one of the two pistons being connected to the brake pedal, which two pistons each limit two corresponding pressure chambers in the housing, upon which pistons an actuating force received from the brake pedal is exerted during actuation of the brake pedal by the driver of the vehicle and the two pistons are positioned in a starting position by return springs in the case of the brake pedal not being actuated,
  a pressure medium storage container that is under atmospheric pressure and having at least two storage chambers that are allocated to the pressure chambers,
  a travel detecting device that detects the actuation displacement of the brake pedal or the least one of the two pistons that is connected to the brake pedal,
  a first pressure sensor for the purpose of detecting a hydraulic pressure that is built up in the master brake cylinder by way of the actuating force received from the brake pedal,
  a travel simulator having a simulator release valve that conveys a haptic brake pedal sensation effect to the driver when operating in the brake-by-wire operating mode, wherein the travel simulator is connected in a hydraulic manner to one of the pressure chambers and the effect of the travel simulator can be interrupted in the fallback operating mode,
  a first electrically controllable pressure source that provides a brake system pressure,
  a second pressure sensor for detecting the brake system pressure,
  a pressure modulation unit that includes for each of at least one wheel brake an intake valve and an exhaust valve for adjusting the brake pressures for individual wheels of the vehicle, which brake pressures are derived from the brake system pressure, wherein in the non-actuated state, the intake valves pass the brake system pressure onto the wheel brakes and the exhaust valves interrupt the flow of pressure medium from the wheel brakes,
  separating valves for separating the master brake cylinder pressure chambers from the pressure modulation unit,
  switching valves for connecting the first electrically controllable pressure source to the pressure modulation unit in a hydraulic manner,
  an electronic control and regulation unit,
  a second electrically controllable pressure source having an output volume flow that is connected together with an output volume flow of the first electrically controllable pressure source,
  wherein the electronic control and regulation unit includes a first electrical circuit and a second electrical circuit, and
  wherein the wherein the first electrical circuit comprises a first processor and the second electrical circuit comprises a second processor, a second valve driver assembly for the separation valves and the switching valves, and a power output stage for controlling the electrical drive of the first electrically controllable pressure source;
  wherein the first electrical circuit further comprises a valve driver assembly for the inlet valves and the exhaust valves of the pressure modulation unit, and a pump driver for the second electrically controllable pressure source for an electric motor of a pump of the second electrically controllable pressure source;
  wherein the switching valves are normally closed to block fluid flow between the first electrically controllable pressure source and the pressure modulation unit, and the separation valves are normally open to permit fluid flow between the master cylinder and the pressure modulation unit.

13. The brake system of claim 12, wherein the separating valves are disposed directly between the master cylinder and the pressure modulation unit such that for each the at least one wheel brake one of the separating valves is the only valve disposed between the intake valve of the wheel brake and the master cylinder.

14. The brake system of claim 12, wherein each of the switching valves is disposed between the first electrically controllable pressure source and the pressure modulation unit and is also disposed between the second electrically controllable pressure source and the pressure modulation unit.

15. The brake system of claim 12, wherein the master cylinder and the first electrically controllable pressure source are connected in parallel to the pressure modulation unit.

* * * * *